United States Patent [19]

Bean et al.

[11] 4,142,981

[45] Mar. 6, 1979

[54] TONER COMBINATION FOR CARRIERLESS DEVELOPMENT

[75] Inventors: Lloyd F. Bean, Rochester; Roger L. Miller, Penfield, both of N.Y.

[73] Assignee: Xerox Corporation, Stamford, Conn.

[21] Appl. No.: 812,949

[22] Filed: Jul. 5, 1977

[51] Int. Cl.² .................... G03G 9/08; G03G 13/08
[52] U.S. Cl. ............................ 252/62.1 P; 96/1 SD
[58] Field of Search .................. 252/62.1 P; 96/1 SD

[56] References Cited

U.S. PATENT DOCUMENTS

| | | | |
|---|---|---|---|
| 2,890,968 | 6/1959 | Giaimo | 252/62.1 P X |
| 3,212,888 | 10/1965 | Neugebauer | 252/62.1 P X |
| 3,345,294 | 10/1967 | Cooper | 252/62.1 P X |
| 3,349,703 | 10/1967 | Varron et al. | 252/62.1 P X |
| 3,650,797 | 3/1972 | Tomanek | 252/62.1 P X |
| 3,720,617 | 3/1973 | Chatterji et al. | 252/62.1 P |
| 3,983,045 | 9/1976 | Jugle | 252/62.1 P |
| 4,031,021 | 6/1977 | Deming | 252/62.1 P |
| 4,051,077 | 9/1977 | Fisher | 252/62.1 P |

*Primary Examiner*—Roland E. Martin, Jr.

[57] ABSTRACT

A toner and electrostatic development process involving electrostatic development without carrier is disclosed. The toner of the invention is effectively transferred from photoreceptors to plain paper after development. The toner is formed of a combination of an insulating toner and conductive toner that are not triboelectrically active with respect to each other.

9 Claims, No Drawings

TONER COMBINATION FOR CARRIERLESS DEVELOPMENT

BACKGROUND OF THE INVENTION

This invention relates to electrophotographic development utilizing magnetic toner particles which are applied from magnetic brush to the electrostatic latent image without use of a carrier material.

A vast majority of the electrographic copying processes in use today involve creation on a suitable recording medium of an electrostatic charge pattern corresponding to a pattern of light and shadow to be reproduced and the development of that pattern by deposition of marking material on the recording medium according to forces generated by such electrical potential pattern. Xerography is the most widely known of these techniques. The substrate may be photoconductive, such as in the case of selenium as taught by Carlson in U.S. Pat. No. 2,297,691, or may be a conventional insulating substrate overlying a photoconductor layer, as described in Watanabe, U.S. Pat. No. 3,536,483, to name a few examples.

After creation the electrical potential pattern is generally developed by means of a finely divided developer powder thus giving form to the hitherto latent electrostatic image. In a common technique a fine, insulating, electroscopic powder is cascaded over the electrical potential pattern bearing member. The powder is, in the conventional use, triboelectrically charged to a definite polarity and deposits preferentially in regions of the surface where there is a preponderance of charge of the opposite polarity. The triboelectric charge is caused by presence of carrier beads in the powder mix. This technique of development is called cascade development.

In another form of development, called magnetic brush development, magnetic carriers or magnetic toners are employed. In this technique a magnetic force is used to provide adherence of the toner-carrier mixture to a support member which is then presented to the image bearing member. In comparison to cascade development, magnetic brush development fills in solid areas better, is more compact, and does not depend on gravity to present the toner to the surface, a factor which allows freedom in locating the developer station.

In yet another form of electrostatic charge pattern development, a conductive one-component toner is used by bringing a conductive support member bearing a layer of fine conductive toner powder into contact with the charge pattern bearing member as in U.S. Pat. No. 3,166,432 to Gundlach. In this case the toner is held to the support member by van der Waal's forces and the conductive support member is held at a bias potential during development. This technique fills in solid areas and requires only one component in the developer material.

A further method of developing an electrostatic charge pattern is to employ an electroscopic toner suspended in a liquid. With the proper choice of materials, the toner becomes charged to a definite polarity when dispersed in the liquid. When the electrostatic charge pattern bearing member is brought into contact with the liquid suspension, the toners deposit where there is a preponderance of charge of the opposite polarity as in cascade development.

While all of the above techniques have certain advantages in particular situations, each one suffers from disadvantages which impair their utility in actual machines.

In the conventional cascade development technique the toner-carrier combination has a definite charge polarity and is not reversible without charging the toner or the carrier. Thus, positive and negative developed images cannot easily be made. Also the images are hollow and solid areas are not filled in resulting in low-fidelity development compared to the original charge pattern. The triboelectric properties of the toner, while necessary to development, cause severe problems. Uneven charging of the toners causes backgrounding as do the uneven forces between carrier and toner result in varying threshold levels from toner to toner. Also, since the toner does not retain its charge for long periods of time, during cascading some toners escape the development region and enter other parts of the apparatus causing mechanical problems. These problems, coupled with the inherent problem of using a two-component system where only one component is depleted, definitely limit the utility of such techniques.

The magnetic brush development, as it also uses carrier, suffers from some of the above mentioned disadvantages although it overcomes others. As mentioned above, this technique is less efficient but helps to fill in solid areas. However, it still requires triboelectric toners, which have the concomitant problems mentioned above. Also, due to the mechanical brusning action and other electrical characteristics, this technique usually results in high background desposition and poor machine latitude.

A system utilizing two different toners has been proposed in U.S. Pat. No. 3,262,806 wherein the toners acquire opposite charges when mixed with a carrier. This development system may be used for simultaneous development of images and background in two colors. This system is difficult to control as the two toners are not used at the same rate and it becomes unbalanced.

The process described in Gundlach, U.S. Pat. No. 3,166,432, has many advantages over the above mentioned cascade type techniques. However, it suffers from drawbacks which limit its applicability. The van der Waal's forces, which act to adhere the toner onto the conductive support member, are a counterforce to the image producing electric force generated by the electrostatic charge pattern, and as such must be selectively overcome to have toner deposited. The van der Waal's forces are weak and non-uniform from one toner to the next. Also high contrast is difficult to achieve. The fact that the van der Waal's forces are not under direct control but subject largely to the surface properties of the materials involved makes the system highly susceptible to alteration of development properties upon wearing of the involved surfaces or variations in ambient conditions of temperature and humidity.

In a liquid development technique most of the problems of cascade development are present in addition to others unique to a liquid system. Also, as in the case of cascade development, the charge on a given toner is not well controlled, resulting in high background deposition, poor machine latitude, and a characteristic splotchiness in large dark or grey areas. The inherent problems of the handling liquids, usually solvents, in a machine are also present.

There have been suggested systems for magnetic development not utilizing the carrier material. One such system was described in U.S. Pat. No. 2,846,333 to Wilson. Wilson et al disclosed the use of magnetic brush to apply toner particles formed of ferrites and resin material to develop electrostatic latent images. The difficulty with this process was the conductivity of the toner makes electrostatic transfer difficult.

A further development of electrostatic development without carriers is illustrated by Kotz, U.S. Pat. No. 3,909,258 wherein an electrostatic development process utilizing a magnetic brush without carrier is illustrated. A toner suitable for use in the Kotz process is disclosed in U.S. Pat. No. 3,639,245 to Nelson wherein a dry toner powder having specific electric conductivity is disclosed. The toner of Nelson is formed by blending magnetite with the resin and then after blending pulverizing to a small particle size. The particles are then mixed with conductive carbon black which is embedded in the surface of the particle to make it conductive and then a small particle size $SiO_2$ agent is mixed into the toner to improve the flowability. The toner of Nelson suffers the disadvantage that it does not transfer efficiently from a photoconductive substrate to plain bond paper.

Therefore there is a continuing need for toners suitable for use in carrierless development systems both with and without the use of magnetic development. There is a need for toners suitable for high speed development that also have good electrostatic transfer characteristics for high transfer efficiency from a photoconductive surface to plain bond paper.

SUMMARY OF THE INVENTION

It is an object of this invention to provide toners overcoming the above noted deficiencies.

It is another object to produce clear sharp images by magnetic brush development of electrostatic images without using a carrier.

It is an additional object to produce a toner for non-magnetic development systems not using a carrier.

It is a further additional object to produce a development system free of triboelectric problems.

It is still another object to produce two component toner blends where the toner blend does not become unbalanced during use.

It is a further object to produce a toner that will transfer electrostatically from the photoreceptor to plain bond paper.

It is another additional object to form a toner suitable for high speed development by magnetic brush system without carrier.

It is a still further object to produce a toner that will transfer efficiently.

It is still an additional object of this invention to form toners that develop magnetically and transfer efficiently electrostatically.

It is another object to form toners which after transferred to paper adhere sufficiently well by electrostatic forces that image disturbances (blur) do not occur on handling prior to fusing.

These and other objects of the invention are generally accomplished by formation of a toner comprising a mixture of an electrically conductive toner and an insulating toner that are not triboelectrically active with each other mixed together to form a two-component toner developer material for use without a carrier in development of electrostatic latent images.

In a specific embodiment in accordance with the instant invention a combination toner is formed of an insulating non-magnetic toner comprising carbon black in the amount of about 8% and polystyrene resin. This is mixed in a 50 parts by volume ratio with a conductive toner formed of a 50% by weight loading of magnetite in a polystyrene resin. This combination of toner when utilized without carrier in a magnetic toner brush development system is found to form excellent images which transfer with an efficiency of greater than 70% to plain bond paper.

DESCRIPTION OF THE INVENTION

The combination of toners used to form the developer of the instant invention are selected such that they have similar triboelectric properties and are not triboelectrically active with each other. The triboelectric properties are similar when measured by means such as separate comparison of tribo of each toner with a common carrier. Further the triboelectric properties are such that when the toner itself is formed by the combination of insulating toner particles and conductive toner particles the triboelectric relationship is such that the tribo of the toner combination is very low. The triborelationship of the conductive and insulating materials should be such that when one material is formed into a carrier size particle, about 100 microns, and the other into a toner size particles, about 15 microns, the tribo measurement by standard means indicates the particles to be essentially uncharged. The use of a Faraday Cage, such as suitable for these tests, in tribo measurement is described at column 11 of U.S. Pat. No. 3,533,835.

The insulating toner which forms part of the combination toner of the instant invention may be selected from conventional insulating toners which are used in development processes utilizing a carrier, such as cascade and carrier using magnetic brushes. These insulating toners generally have a powder resistivity of greater than $10^{11}$ ohm-cm. A preferred resistivity is $10^{13}$–$10^{16}$ ohm-cm to give good electrostatic transfer in the instant invention. The insulating toner may have incorporated therein any colorant which results in a suitable print when utilized with the magnetic toner with which it is combined. There are many dyes and pigments known for use in toners.

Electrostatographic toner colorants are well known and include, for example, nigrosine dyes, aniline blue, Calco Oil Blue, chrome yellow, chrome green, ultramarine blue, cobalt blue, duPont Oil Red, benzidine yellow, Quinoline Yellow, methylene blue chloride, phthalocyanine blue or green, Malachite Green Oxalate, Rose Bengal, and mixtures thereof. The pigment or dye or pigment and dye, should be present in the toner in a sufficient quantity to render it highly colored so that it will form a clearly visible image on a recording member. Thus, for example, where conventional electrostatographic copies of typed documents are desired, the toner may comprise a black pigment such as carbon black or a black dye such as Amaplast Black dye, available from National Aniline Products, Incorporated. Preferably, the pigment is employed in an amount from about 3% to about 20% by weight based on the total weight of the colored toner because better images are obtained. If the toner colorant employed is a dye, substantially smaller quantities of colorant may be used.

The conductive toner portion of the combination toner of the invention is characterized by a powder resitivity of between about $10^4$ and $10^{10}$ ohm-cm. The preferred resistivity is between about $10^4$ and about $10^6$ ohm-cm for good electrostatic development of the combination toner of the invention.

The powder resistivity difference between the insulating and conductive toner is suitably greater than the $10^4$ ohm-cm. Generally a preferred difference is at least about $10^6$ ohm-cm between the resistivity of the conductive and insulating toners to give both good development and electrostatic transfer.

The magnetic toner brush of the instant invention in contrast to conventional practice can be used to develop a latent image of either polarity. In conventional systems such as the above referenced U.S. Pat. No. 3,909,258 the magnetic toner brush can be used to develop a latent image of only one given polarity. Although not wishing to be bound by any particular theory of operation it is believed that the surprising performance of the instant system may be explained as follows: The conductive particles are attracted to the electrostatic image, then the field in the vicinity of the conductive particle forms a fringe field such that the insulating particles are attracted to the fringe field and developed.

The combination toner of the invention may be formed from any ratio of conductive toner to insulating toner. A suitable range has been found to be between about 30 and about 80 percent by weight conductive toner in the combination toner. Too great an amount of insulating toner does not develop whereas too great an amount of conductive toner does not transfer. A preferred range has been found to be about 40 to about 70 weight percent by weight conductive toner in the combination toner for good development and transfer characteristics.

The development system utilized for the instant invention may be any method which brings the toner into contact with an electrostatic latent image without utilizing carrier beads. Typical of systems suitable for the instant invention are fluid bed development, cascade without carrier, fur brush and flooding a photoreceptor with toner and removing by vacuum or air pressure. The preferred development system for the instant invention is carrierless magnetic toner brush development as this means gives sharp images and low background. Further, either the conductive or insulating toner of the combination toner of the invention is readily made magentic by inclusion of magnetic pigment such as magnetite.

The particle size of the combination toners of the invention may be any size which results in good quality images and satisfactory development and transfer. A suitable particle size image for both the conductive and insulating toner is greater than 95% of the particles between about 1 and about 40 microns. A preferred particle size range is greater than 95% of the particles between 5 and 30 microns to give sharp images.

The successful operation of the combination toner of this invention is surprising in that previous systems utilizing several toners with one carrier have not successfully transferred to the image the entire toner load, resulting in eventually a concentration of one type of toner being built up in the system. Surprisingly this has not happened in the instant system and further surprisingly development without carrier and transfer have been successful.

The preferred conductive magnetic toners of the instant invention are referred to as magnetic because they are attracted to a magnet. They are not themselves magnets. The toners are held to a magnetic brush roller or belt by magnetic forces.

The magnetic pigment utilized in the magnetic conductive toners of the invention may be any suitable particle which will give the desired magnetic properties. Typical of such materials are chromium oxide, ferrites, iron particles and nickel alloys. Preferred for the instant process are magnetite particles as they are black in color, low cost and provide excellent magnetic properties. The magnetite particles may be of any shape and any size which results in a conductive toner particles with good transfer properties. Generally the pigment particle size is between 0.02 micron and about 1 micron. A preferred average particle size for the magnetite particles is about 0.1 to 0.5 micron average particle size. The particles may be any shape including acicular or cubic shaped.

The transfer efficiency of the combination toners of the invention is greater than about 70 percent and generally reaches greater than 85 percent in ordinary electrostatic transfer.

The magnetic pigment may be utilized in the conductive toner in any amount that forms a magnetic toner. A suitable range has been found to be magnetic pigment content between about 40 and about 80 weight percent of magnetic particle in the finished magnetic conductive toner. A preferred range is a magnetite content between about 45 and 55 weight percent of magnetite for good development properties and good transfer.

The toner resins for both the conductive and insulating toner may be selected from any suitable toner resin material having the desired triboelectric relationship and fusing properties.

Any suitable resin possessing the properties as above described may be employed in the system of the present invention. Typical of such resins are polyamides, polyurethanes, epoxy, vinyl resins and polymeric esterification products of a dicarboxylic acid and a diol comprising a diphenol. Any suitable vinyl resin may be employed in the toners of the present system including homopolymers or copolymers of two or more vinyl monomers. Typical of such vinyl monomeric units include: styrene; p-chlorostyrene; vinyl naphthalene; ethylenically unsaturated mono-olefins such as ethylene, propylene, butylene, isobutylene and the like; vinyl esters such as vinyl chloride, vinyl bromide, vinyl fluoride, vinyl acetate, vinyl propionate, vinyl benzoate, vinyl butyrate and the like; esters of alpha-methylene aliphatic monocarboxylic acids such as methyl acrylate, ethyl acrylate, n-butylacrylate, isobutyl acrylate, dodecyl acrylate, n-octylacrylate 2-chloroethyl acrylate, phenyl acrylate, methyl-alpha-chloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether, and the like; vinyl ketones such as vinyl methyl ketone, vinyl hexyl ketone, methyl isopropenyl ketone and the like; vinylidene halides such as vinylidene chloride, vinylidene chlorofluoride and the like; and N-vinyl compounds such as N-vinyl pyrrol, N-vinyl carbazole, N-vinyl indole, N-vinyl pyrrolidene and the like; and mixtures thereof.

It is generally found that toner resins containing a relatively high percentage of styrene are preferred since greater image definition and density is obtained with their use. The styrene resin employed may be a homopolymer of styrene or styrene homologs or copolymers of styrene with other monomeric groups containing a single methylene group attached to a carbon atom by a double bond. Any of the above typical monomeric units may be copolymerized with styrene by addition polymerization. Styrene resins may also be formed by the polymerization of mixtures of two or more unsaturated monomeric materials with a styrene monomer. The addition polymerization technique employed embraces known polymerization technique such as free radical, anionic and cationic polymerization processes. Any of these vinyl resins may be employed including resin modified phenolformaldehyde resins, oil modified epoxy resins, polyurethane resins, cellulosic resins, polyether resins and mixtures thereof.

Polymeric esterification products of a dicarboxylic acid and a diol comprising a diphenol may also be used as a preferred resin material for the toner compositions of the instant invention. The diphenol reactant has the general formula:

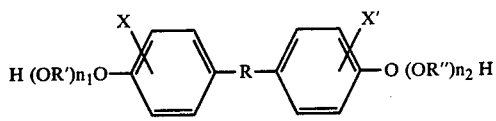

wherein R represents substituted and unsubstituted alkylene radicals having from 2 to 12 carbon atoms, alkylidene radicals having from 1 to 12 carbon atoms and cycloalkylidene radicals having from 3 to 12 carbon atoms; R' and R" represent substituted and unsubstituted alkylene radicals having from 2 to 12 carbon atoms, alkylene arylene radicals having from 8 to 12 carbon atoms and arylene radicals; X and X' represents hydrogen or an alkyl radical having from 1 to 4 carbon atoms; and $n_1$ and $n_2$ are each at least 1 and the average sum of $n_1$ and $n_2$ is less than 21. Diphenols wherein R represents an alkylidene radical having from 2 to 4 carbon atoms and R' and R" represents an alkylene radical having from 3 to 4 carbon atoms are preferred because greater blocking resistance, increased definition of xerographic characters and more complete transfer of toner images are achieved. Optimum results are obtained with diols in which R' is an isopropylidene radical and R' and R" are selected from the group consisting of propylene and butylene radicals because the resins formed from these diols possess higher agglomeration resistance and penetrate extremely rapidly into paper receiving sheets under fusing conditions. Dicarboxylic acids having from 3 to 5 carbon atoms are preferred because the resulting toner resin possesses greater resistance to film formation on reusable imaging surfaces and resist the formation of fines under machine operation conditions. Preferred results are obtained with alpha unsaturated dicarboxylic acids including fumaric acid, maleic acid or maleic acid anhydride because maximum resistance to physical degradation of the toner as well as rapid melting properties are achieved. Any suitable diphenol which satisfies the above formula may be employed. Typical such diphenols include: 2,2-bis(4-beta hydroxy ethoxy phenyl)propane, 2,2-bis(4-hydroxy isopropoxy phenyl) propane, 2,2-bis(4-beta hydroxy ethoxy phenyl) pentane, 2,2-bis(4-beta hydroxy ethoxy phenyl)-butane, 2,2-bis(4-hydroxy-propoxy-phenyl)propane, 2,2-bis(4-hydroxy-propoxy-phenyl) propane, 1,1-bis(4-hydroxy-ethoxy-phenyl) heptane, 2,2-bis(3-methyl-4-beta-hydroxy ethoxy-phenyl) propane, 1,1-bis(4-beta hydroxy ethoxy phenyl)-cyclohexane, 2,2'-bis(4-beta hydroxy ethoxy phenyl)norbornane, 2,2'-bis(4-beta hydroxy ethoxy phenyl)norbornane, 2,2-bis(4-beta hydroxy styryl oxyphenyl) propane, the polyoxyethylene ether of isopropylidene diphenol in which both phenolic hydroxyl groups are oxyethylated and the average number of oxyethylene groups per mole is 2.6, the polyoxypropylene ether of 2-butylidene diphenol in which both the phenolic hydroxy groups are oxyalkylated and the average number of oxypropylene groups per mole is 2.5, and the like. Diphenols wherein R represents an alkylidene radical having from 2 to 4 carbon atoms and R' and R" represent an alkylene radical having from 3 to 4 carbon atoms are preferred because greater blocking resistance, increased definition of xerographic characters and more complete transfer of toner images are achieved. Optimum results are obtained with diols in which R is isopropylidene and R' and R" are selected from the group consisting of propylene and butylene because the resins formed from these diols possess higher agglomeration resistance and penetrate extremely rapidly into paper receiving sheets under fusing conditions.

Any suitable dicarboxylic acid may be reacted with a diol as described above to form the toner compositions of this invention either substituted or unsubstituted, saturated or unsaturated, having the general formula:

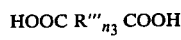

wherein R''' represents a substituted or unsubstituted alkylene radical having from 1 to 12 carbon atoms, arylene radicals or alkylene arylene radicals having from 10 to 12 carbon atoms and $n_3$ is less than 2. Typical such dicarboxylic acids including their existing anhydrides are: oxalic acid, malonic acid, succinic acid, glutaric acid, adipic acid, pimelic acid, suberic acid, azelaic acid, sebacic acid, phthalic acid, mesaconic acid, homophthalic acid, isophthalic acid, terephthalic acid, o-phenyleneacetic-beta-propionic acid, itaconic acid, maleic acid, maleic acid anhydride, fumaric acid, phthalic acid anhydride, traumatic acid, citraconic acid, and the like. Dicarboxylic acids having from 3 to 5 carbon atoms are preferred because the resulting toner resins possess greater resistance to film formation on reusable imaging surfaces and resist formation of fines under machine operation conditions. Optimum results are obtained with alpha unsaturated dicarboxylic acids including fumaric acid, maleic acid, or maleic acid anhydride because maximum resistance to physical degradation of the toner as well as rapid melting properties are achieved. The polymerization esterification products may themselves be copolymerized or blended with one or more other thermoplastic resins, preferably aromatic resins, aliphatic resins, or mixtures thereof. Typical thermoplastic resins include: resins modified phenolformaldehyde resin, oil modified epoxy resins, polyurethane resins, cellulosic resins, vinyl type resins and mixtures thereof. When the resin component of the toner contains an added resin, the added component should be present in an amount less than about 50 percent by weight based on the total weight of the resin present in the toner. A relatively high percentage of the polymeric diol and dicarboxylic acid condensation product in the resinous component of the toner is preferred because a greater reduction of fusing temperatures is achieved with a given quantity of additive material. Further, sharper images and denser images are obtained when a high percentage of the polymeric diol and dicarboxylic acid condensation product is present in the toner. Any suitable blending technique may be employed to incorporate the added resin into the toner mixture. The resulting resin blend is substantially homogeneous and highly compatible with pigments and dyes. Where suitable, the colorant may be added prior to, simultaneously with or subsequent to the blending or polymerization step.

Optimum electrophotographic results are achieved with styrene-butyl methacrylate copolymers, styrene-vinyltoluene copolymers, styrene-acrylate copolymers, polystyrene resins, predominately styrene or polystyrene based resins as generally described in U.S. Pat. No. Re. 25,136 to Carlson and polystyrene blends as described in U.S. Pat. No. 2,788,288 to Rheinfrank and Jones.

Any conventional method of toner particle formation may be utilized in the instant invention which results in toner of the desired properties. Typical of known methods are spray drying, hot melt formation and mastication followed by attrition to toner particle size.

DESCRIPTION OF THE PREFERRED EMBODIMENTS

The following Examples further define, describe and compare methods of preparing toners of the instant invention and of utilizing them in electrophotographic applications. Parts and percentages are by weight unless otherwise indicated.

EXAMPLE I

A conductive toner is formed by spray drying a slurry of about 100 grams magnetite MO-4232 from Pfiser and 48% Piccolastic D-125, a polystyrene, and about 400 grams toluene. This mixture is spray dried to an average 15 micron particle size using a Bowen spray dryer at a feed rate of about 200 milliliters at a temperature of about 200° F. A non-magnetic insulating toner is formed by mastication of Piccolastic D-125, a polystyrene with about 8 parts by weight Raven 330 carbon black followed by cooling and attrition to toner particle size of about 15 microns. These toners were mixed in equal parts by weight and utilized to develop an electrostatic image by use of a magnetic applicator roll. The photoreceptor image has a positive charge. The toner is found to successfully develop the electrostatic image and transfer at about a 70% efficiency rate. Further the toner fuses to form a clear sharp uniform image with a conventional Teflon coated internally heated fuser roll.

EXAMPLE II

The process of Example I is repeated except the conductive magnetic toner commercially available from 3-M as 892-VHS believed to be a copolymer of epoxy and styrene is substituted for the conductive magnetic toner. This toner mixture also demonstrates good development and transfer characteristics when used in a development system without carrier.

EXAMPLE III

The process of Example I is successfully repeated except that the insulating toner is formed from about 144 parts by weight Piccolastic D-125, about 5 parts Neo Spectra Mark II Carbon Black, about 5 parts by weight Iosol Black and an Aniline dye and about 5 parts by weight of Spirit Nigrosine SSB an Aniline dye both dyes are from Allied Chemical.

EXAMPLE IV

The magnetic toner of Example II and the insulating toner of Example III are mixed in equal weight to form a combination toner and used without a carrier to develop and transfer a latent electrostatic image. The system exhibits good transfer and development properties.

EXAMPLE V

A combination toner is formed. The insulating toner is formed of 50 parts by volume of a toner of 15 micron average particle size formed by mastication and attrition of about 8 parts by weight carbon black and about 92 parts by weight of Piccolastic D-125 a polystyrene resin. The conductive magnetic toner is formed by mastication and attrition of a mixture of 55 parts by weight magnetite and 45 parts by weight of Piccolastic D-125. The magnetic toner also has an average particle size of about 15 microns and exhibits magnetic properties. The first formed toner of polystyrene and carbon black exhibits insulating properties and has a resistivity of greater than $10^{11}$ ohm-cm. The toner combination when used in a magnetic toner brush development system exhibits good development and transfer properties.

EXAMPLE VI

As a control, Example V is repeated except development is accomplished with only the magnetic toner in the system without combination with the insulating toner. Transfer of this toner after development is only about 25% efficient. Whereas the mixture of toners transferred at about 70% efficiency.

EXAMPLE VII

As a control, Example V is repeated except the insulating toner is utilized in cascade without carrier and without combination with an electrically conductive toner. Development is poor with only the edges of the image developed while the middle portion is not covered.

EXAMPLE VIII

This example illustrates the performance of the process of the invention utilizing an electrically conductive toner which is not also magnetic as one component of the combination toner. A conductive toner is formed by mastication and attrition to form a toner comprising 10 percent by weight Neospectra Mark II Carbon Black and 90% by weight poly(hexamethylene sebacate) of number average molecular weight ($M_N$) 11,400 g/mole and molecular weight distribution (MWD) 3.13. An insulating toner is formed by mastication and attrition having the composition 9 parts by weight of Neospectra Mark II Carbon Black and 90 parts by weight styrene-n-butylmethacrylate. An electrostatic latent image on the flat plate photoreceptor of a Model D copier was developed with a combination toner formed of equal parts of each of the insulating and conducting toners. The development is by flooding the plate with toner than removing the excess with an air knife which is a thin elongated air stream. The image is found to be sharp and completely developed including center portions.

EXAMPLE IX

The example illustrates the combination toner and process of the invention utilizing a magnetic insulating toner and a magnetic conductive toner to form the combination toner. An insulating magnetic toner is formed by spray drying a toluene slurry to form a toner of 65 parts by weight styrene-n-butyl methacrylate, 32 parts magnetite by Pfizer 4232 and 2 percent by weight Neospectra Carbon Black to form a toner of about 15 microns average particle size. This is combined with an equal amount by weight of the magnetic conductive toner of Example V. The combination toner is utilized in development with a magnetic applicator roll on a photoreceptor carrying a positive image. The toner is found to successfully develop and also transfer electrostatically with greater than 70% efficiency.

EXAMPLE X

This example illustrates the combination toner and process of the invention utilizing a magnetic insulating toner and a non-magnetic electrically conductive toner to form the combination toner. The insulating magnetic toner of Example IX is combined in equal parts with the conductive non-magnetic toner of Example VIII. This combination toner is developed successfully in a carrierless magnetic toner brush apparatus. It also transfers electrostatically at greater than 70 percent efficiency.

The resistivity measurements for toner used throughout the application are determined by the following process. Measurements on powder are complicated by the fact that the results are influenced by characteristics of the powder particles shape and size in addition to powder composition. Therefore, measurements were obtained on powder rather than by molding the powder into a pellet specimen in order to better relate the properties to the toner behavior in development. The measurements were made using a two inch diameter electrode of a Balsbaugh cell for measuring the direct current resistivity of the toner. The gap distance is 0.05 inch. The toner is packed between the electrodes of the cell by vibration until a constant bed volume is reached. The current is measured as a function of applied voltage at the 50 mil gap. The electrification time is 1 minute as recommended by ASTM method. After each measurement the sample is repacked by vibration. Resistivity is calculated according to Ohms law.

The transfer efficiency in this application is measured comparing the weight of toner transferred to a paper with the weight of toner remaining on the photoreceptor and removed by an adhesive tape applied thereto after transfer to paper is completed.

Although specific materials and conditions were set forth in the above exemplary processes in the formation and using the toner of the invention there are merely intended as illustrations of the present invention. Various other substituents and processes such as those listed above may be substituted for those in the examples with similar results. In addition to the steps used by the toner of the present invention other steps or modifications may be used. For instance the toner could be classified prior to utilization for developing and transfer. In addition other materials such as plasticizers and flowability regulators could be added.

Other modifications of the present invention will occur to those skilled in the art upon reading the present disclosure. These are intended to be included within the scope of this invention. For instance, the magnetic toner of this invention could be utilized in conventional magnetic development onto zinc oxide paper where transfer did not take place. Further the toner of the invention could be utilized for processes requiring development of magnetic images rather than electrostatic latent images.

What is claimed is:

1. A combination electrophotographic toner composition comprising electrically insulating toner particles and electrically conductive toner particles that are not triboelectrically active with each other, said conductive toner particles comprising resin and magnetic particles, and having a resistivity of between about $10^4$ and $10^{10}$ ohm-cm, and said insulating toner particles comprising resin and carbon black and having a resistivity greater than $10^{11}$ ohm-cm.

2. The toner of claim 1 wherein said insulating toner particles comprise about 20 to about 70 percent by weight of said combination toner composition.

3. The toner of claim 2 wherein said magnetic particles are magnetite and comprise between about 40 and about 80 percent by weight of said toner.

4. The toner of claim 1 wherein said conductive toner comprises between about 40 and about 70 weight percent of said combination toner.

5. The toner of claim 1 wherein said combination toner has particle size range between about 5 and about 30 microns.

6. The toner of claim 1 wherein said conductive and said insulating toners have similar triboelectric properties when compared with a common carrier.

7. The toner of claim 2 wherein said magnetic particles comprise magnetite.

8. The toner of claim 1 wherein said insulating and said conductive toner have a resistivity difference of greater than $10^4$ ohm-cm.

9. The toner of claim 1 wherein said insulating and said conductive toner have a resistivity difference of greater than $10^6$ ohm-cm.

* * * * *